United States Patent [19]
Weberg

[11] 4,099,216
[45] Jul. 4, 1978

[54] FUSELESS INTRINSIC SAFETY BARRIER

[75] Inventor: Lloyd E. Weberg, Phoenix, Ariz.

[73] Assignee: Westinghouse Electric Corp., Pittsburgh, Pa.

[21] Appl. No.: 741,438

[22] Filed: Nov. 12, 1976

[51] Int. Cl.² .............................................. H02H 9/04
[52] U.S. Cl. ........................................ 361/56; 361/58; 361/91
[58] Field of Search ........................ 361/56, 98, 90, 91

[56] References Cited
U.S. PATENT DOCUMENTS 3,423,636  1/1969  Rowley, Jr. .............................. 361/58

OTHER PUBLICATIONS

Control and Instrumentation–Nov. 1975, p. 11.

Primary Examiner—Harry E. Moose, Jr.
Attorney, Agent, or Firm—C. M. Lorin

[57] ABSTRACT

An encapsulated intrinsic safety electric barrier in which at least one positive temperature coefficient resistance device is embedded in the insulation together with the other electrical components of the module.

1 Claim, 3 Drawing Figures

FUSELESS INTRINSIC SAFETY BARRIER

BACKGROUND OF THE INVENTION

It is often required to electrically sense, monitor and control an industrial process or to electrically operate equipment within a hazardous environment, for example where there are inflammable gases or vapors. This is particularly the case in the petroleum and chemical industry.

In order to overcome this problem, the general practice has been to provide an intrinsic saftey barrier between the safe area in which electrical energy is provided, electrical measurements and controls are monitored, and the hazardous area requiring actual measuring and processing in situ or remotely.

An intrinsic safety barrier essentially consists in circuitry interposed between two opposite pairs of poles for diverting any excessive current or voltage back to the poles on the safe area side away from the poles facing the hazardous area. Any faulty operation or defective component of the circuitry establishes a safe current diversion or voltage limitation to automatically keep the poles connected to circuitry within the hazardous area under safe levels of voltage and current. As a precaution against tampering or involuntary human intervention, the circuit is totally encapsulated or potted, leaving only the external connectors well identified for insertion at the interface between the safe and the hazardous area. Examples of intrinsic safety barriers of the prior art can be found in U.S. Pat. Nos. 3,527,985 of K. J. Brown; 3,684,924 of Edward J. Miller; 3,845,356 of Alvan H. Bullard et al; 3,878,434 of Ernst W. Voorhoeve; 3,813,578 of Floyd L. Tiffany; and 3,973,170 of James A. Hogan.

As a precautionary measure against overcurrent which could damage essential components of the intrinsic safety barrier circuitry, thus avoiding additional derivative circuits therein against such faulty components, at least one fuse has been provided in the past which is made part of the overall circuit. This is shown by the aforementioned Voorhoeve and Tiffany patents. However, with an encapsulated module, should the fuse be blown out, the circuit becomes definitely interrupted and the whole module must be replaced.

The prior art shows instances where one tries to do away with a fuse by automatically circumventing the faulty components. This is the solution adopted for a fuseless inverter described in U.S. Pat. No. 3,887,860 of Thomas J. Bernhardt et al. This solution is expensive and self-defeating when applied to an intrinsic safety barrier where a fuse is called for.

The present invention resides in a fuseless intrinsic safety barrier encapsulated module.

SUMMARY OF THE INVENTION

The invention resides in a fuseless intrinsic safety barrier encapsulated module having a plurality of electrical components therein adapted to be connected with an external power supply in a safe area and to an industrial process in a hazardous area, comprising:

at least one positive temperature coefficient resistance device encapsulated with said components as a resistance connected to one of the external connectors of the module on the safe area side thereof for limiting overcurrent therefrom under faulty conditions with the external power supply.

It is known from U.S. Pat. No. 3,209,206 of J. J. Courtin to embed a positive temperature coefficient resistance in an encapsulation in order to provide an overtemperature protective system for detecting overloads in branch circuit conductors of inherently protected electrical apparatus. While the prior art shows the use of an encapsulated thermistor for the detection of an overload by sensing localized overtemperature, the invention is concerned with a temperature sensitive component encapsulated with other circuit components for the detection of an overcurrent within a circuit involving one or more such other circuit components. Moreover, in the prior art the encapsulated thermistor reacts to temperature by actuating some other protective device, whereas the temperature sensitive component according to the present invention is used as a protective device for the overall circuit.

A simple, compact, inexpensive and safe encapsulated module is, according to the invention, provided having self-contained automatic protection and resetting capability.

DESCRIPTION OF THE PREFERRED EMBODIMENT

Figure 1:
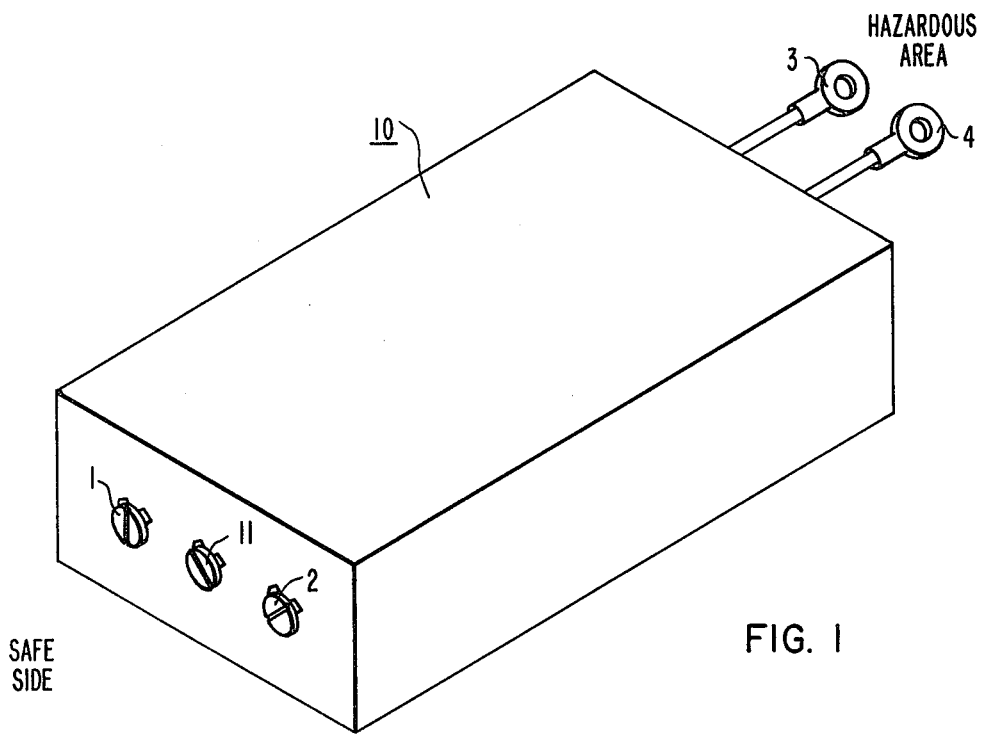
FIG. 1 shows an encapsulated circuit module such as could embody the circuit according to the invention.

Referring to FIG. 1, an encapsulated circuit module 10 is shown with, at one end, external connectors 1 and 2 for the two poles of a typical 27 volts direct current supply and a ground connector 11, which are to be connected with the power supply and the signal conditioner circuit of a control room in the safe area. Two external connectors 3 and 4 are shown at the opposite end, which are to be connected with the signal conveying lines of the process in the hazardous area.

Figure 2:
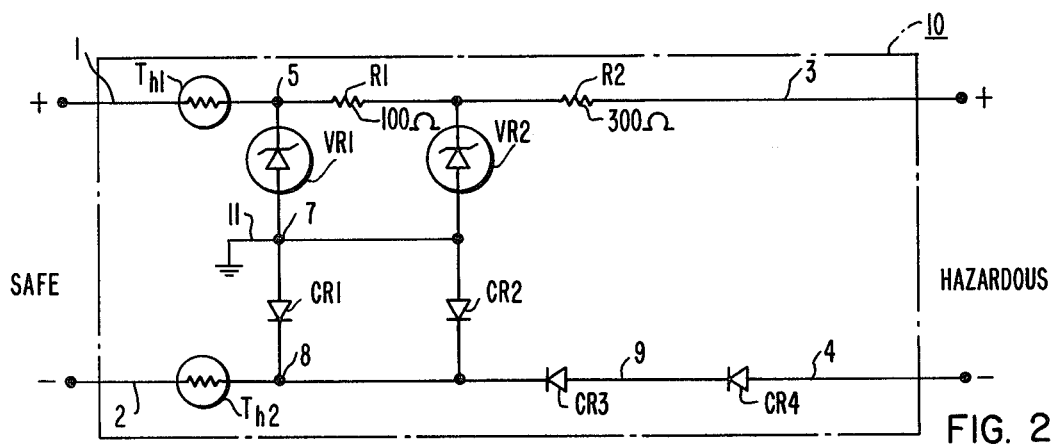
FIG. 2 shows the circuit of an intrinsic safety barrier module according to the invention.

Referring to FIG. 2, an intrinsic safety barrier is shown as could be embedded in insulating epoxy resin to form an encapsulated module such as the one shown in FIG. 1. The basic circuit of FIG. 2 has been generally described by Anthony E. Turner in Instrument Society of America publication Paper No. 74-801, pages 1–5 (1974), an article entitled "Intrinsic Safety Made Easy For All Hazardous Atmospheres".

At the wiring interface between the safe and unsafe areas the electric barrier typically includes a network of Zener diodes $VR_1$, $VR_2$ mounted in a bridge at the two opposite ends of a resistor $R_1$ and across the quadripole defined by the two-wire safe area side 1, 2 and the two-wire hazardous side 3, 4. Junction point 7 common to the two anodes of the Zener diodes is grounded through the external connector 11, and from each Zener diode this end is connected to the wire line defined by external connectors 2 and 4 through bridging diodes $CR_1$, $CR_2$ in such a way that the anodes of the diodes are also connected to ground. In this fashion, the circuit comprises two polarity sides. The positive half includes wire-line 1, 3 and the two Zener diodes $VR_1$, $VR_2$. The negative half includes wire-line 2, 4 and diodes $CR_1$, $CR_2$. The circuit further includes within the wire-line 2, 4 serially connected diodes $CR_3$, $CR_4$ which are blocking in the direction toward the hazardous area. The wire-line 1, 3 includes an additional resistor $R_2$ mounted in series with resistor $R_1$ from the $VR_2$ side thereof to connector 3. Typically, $R_1$ has a value of 100 ohms and $R_2$ a value of 300 ohms. The circuit also includes two thermistors $Th_1$ and $Th_2$ inserted after one of the safe area connectors 1, 2 in each of the wire-lines (1, 3), (2, 4).

The positive half of the barrier ($Th_1$, $VR_1$, $VR_2$, $R_1$, $R_2$) will prevent the voltage on the positive terminal 3 of the hazardous side with reference to ground from exceeding the avalanche voltage of Zener diodes $VR_1$ and $VR_2$. Resistors $R_1$ and/or $R_2$ will then limit the current available to the hazardous area. If the supply voltage becomes excessive, causing $VR_1$ and $VR_2$ to conduct greater current than permissible from the positive terminal 1 in the safe area, thermistor $Th_1$ will change its characteristics so as to reduce considerably such current supply. As soon as safe voltage conditions bring the overcurrent back to normal, thermistor $Th_1$ restores the supply voltage on wire-line 1, 3.

In a similar fashion, the negative half of the barrier ($Th_2$, $CR_1$, $CR_2$, $CR_3$, $CR_4$) will prevent any positive supply voltage accidently applied to the negative terminal of the safe side from appearing on the negative connector of the hazardous area. If the supply voltage applied to the negative pole of the safe side becomes negative with reference to ground, the forward conducting diodes $CR_1$, $CR_2$ will limit the voltage and thermistor $Th_2$ will reduce the current until the nornal conditions are restored.

In other words, normally the power supplied from the safe side of the barrier is at a voltage below the Zener diode breakdown level so that under normal conditions the barrier passes the signal (4 to 20 milliamperes) with only the series resistances ($R_1$, $R_2$) having any effect.

Under fault conditions, a voltage above the Zener point is applied which should be prevented from reaching the hazardous side and causing higher currents to flow therethrough. The Zener diodes, such as those shown in FIG. 2, become conducting under such conditions, thereby to hold the voltage to a safe level (about 30 volts). Nevertheless, it is possible that the power dissipated through the diode as a result from the overvoltage exceed its rating and the device will be destroyed. The prior art shows the use of a fuse to prevent such overcurrents. Actually, when a Zener diode is conducting under an overvoltage, it behaves first as a short circuit, then it is destroyed and opens the circuit. The purpose of the fuse in the prior art is to blow the fuse during the short circuit, thus before the diode is destroyed. Therefore, the fuse, although effective to prevent the diode from being destroyed is an all or nothing measure.

The invention provides for the use of a thermistor rather than a fuse. The time/temperature characteristic of the thermistor is so chosen that the time constant of the thermistor (e.g. the time it takes to become effective in the presence of an overcurrent) be smaller than the time constant for which the diode is destroyed. Typically the time constant of a thermistor is larger than the time constant of a fuse. Thus, the thermistor will be effective to limit the overcurrent when a short circuit occurs through the diode due to overvoltage. Since a thermistor inherently "resets" itself, normal operative conditions with the diode will resume in the barrier as soon as the overvoltage is removed. In other words, the thermistor fulfills a protective role which allows the module to be reusable after a temporary overvoltage whereas a fuse will treat it as if it were already a definite failure of the Zener diode which is to be protected under the conventional approach.

The Zener diodes and ordinary diodes are used in pairs for redundancy. From the hazardous side the terminals 3, 4 can be regarded as a non-inductive source of power with a voltage never exceeding the Zener diode ($VR_2$) avalanche level and an impedance equal to $R_2$ + $CR_3$ + $CR_4$. In this particular instance, energy is limited to 27 volts and 90 milliamps.

Figure 3:
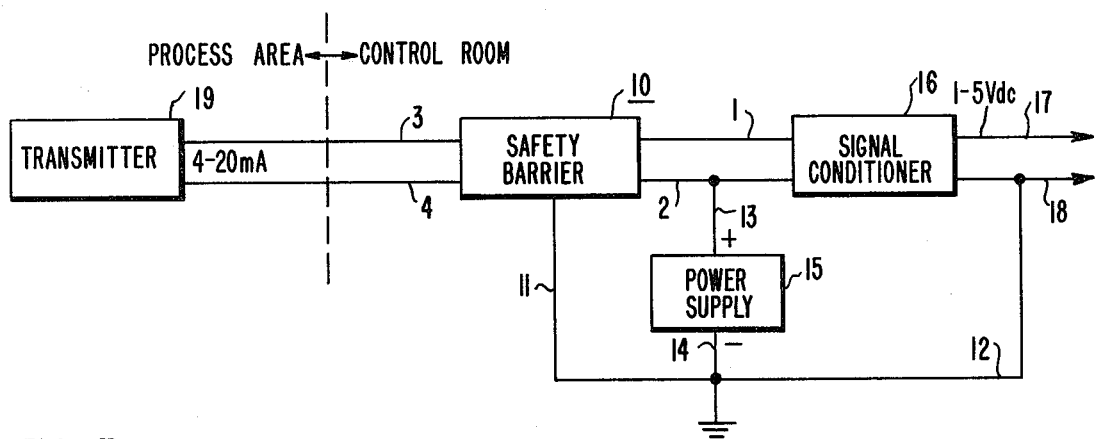
FIG. 3 is a typical signal system embodying an intrinsic safety barrier installed between a hazardous area and a safe control zone and including the module according to the invention.

Referring to FIG. 3, a system is shown embodying the encapsulated module 10 as a safety barrier between the safe and hazardous area.

From the process area the hazardous side information from various electrical devices is transmitted by a transmitter 19 on a two-wire channel connected to terminals 3, 4. In the control room of the safe area, the external connectors (1, 2) of the module are connected to the power supply 15 and to a signal conditioner circuit 16. The positive terminal of the power supply is via line 13 connected to pole 2, and the ground of the power supply via line 14 is connected to connector 11 of the module and to one output 18 of the signal conditioner. The second output of the signal conditioner is shown at 17. With such a system a measured input of 4-20 milliamperes at terminals 3, 4 is converted into a 1-5 volts direct current voltage at the ouput between 17 and 18.

The circuit of FIG. 2 is only illustrative of an intrinsic safety barrier. Other circuits such as shown in the aforementioned patents can be used. The invention resides in the combination within an intrinsic safety barrier circuit of at least one thermistor such as $Th_1$, $Th_2$, encapsulated together with the other components of the circuit so as to form a single module having external connectors. The thermistor, in case of an overcurrent appearing on one of the two wire lines within the module, protects the circuit until normal conditions are restored.

I claim:
1. In an intrinsic safety barrier circuit module having:
   a first pair of pole connectors adapted to be connected to an external power supply and to an external signal conditioning unit; and
   a second pair of pole connectors adapted to be connected to at least one input of an industrial process situated in a hazardous area; the combination of:
   a plurality of electrical components connected in circuit between said two pairs of pole connectors for conveying energy and information therebetween and for applying to said second pair of poles voltage and current of limited magnitude, said plurality including at least one positive temperature coefficient resistance device connected to one of said first pole connectors and operative in said module for limiting overcurrent from said connected one of said first pole under faulty conditions with said external power supply; with at least one of said electrical components being a voltage limiting device, said voltage limiting device being mounted in circuit after said one positive temperature coefficient resistance device, the time constant of said resistance device being smaller in response to an overcurrent than the time constant for which said voltage limiting device is exposed to destructive action by the same overcurrent; and with all of said electrical components of a plurality being encapsulated as a unit to form a fuseless intrinsic safety barrier circuit module.

* * * * *